US006885936B2

(12) United States Patent
Yashio et al.

(10) Patent No.: US 6,885,936 B2
(45) Date of Patent: Apr. 26, 2005

(54) INFORMATION PROVISION SYSTEM AND APPARATUS AND METHOD THEREFOR

(75) Inventors: Hitoshi Yashio, Tokyo (JP); Gou Nakano, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 7 days.

(21) Appl. No.: 10/443,283

(22) Filed: May 22, 2003

(65) Prior Publication Data

US 2004/0005879 A1 Jan. 8, 2004

(30) Foreign Application Priority Data

May 23, 2002 (JP) .................................... P. 2002-148825

(51) Int. Cl.$^7$ ........................ G01C 21/34; G01C 21/36; G08B 1/123; G06F 17/60
(52) U.S. Cl. ..................... 701/207; 701/117; 701/208; 701/211; 701/215; 340/905; 340/993; 340/995.13; 340/995.18; 340/915; 340/917; 340/937; 455/404.2; 705/13
(58) Field of Search ................................ 701/207, 211, 701/117, 208, 215, 302; 340/905, 989, 993, 995.13, 995.18, 995.14, 901, 902, 903, 915, 917, 933, 937; 455/404.1, 404.2; 705/13

(56) References Cited

U.S. PATENT DOCUMENTS

| 5,982,298 | A | * | 11/1999 | Lappenbusch et al. ...... 340/905 |
| 6,252,544 | B1 | * | 6/2001 | Hoffberg ................. 342/357.1 |
| 6,574,548 | B1 | * | 6/2003 | DeKock et al. ............. 701/117 |
| 6,741,926 | B1 | * | 5/2004 | Zhao et al. ................. 701/201 |
| 6,759,970 | B1 | * | 7/2004 | Horita et al. ............... 340/905 |
| 2002/0026244 | A1 | * | 2/2002 | Trieu ....................... 623/17.16 |
| 2002/0086659 | A1 | * | 7/2002 | Lauper ...................... 455/404 |
| 2002/0135471 | A1 | * | 9/2002 | Corbitt et al. ............. 340/436 |
| 2003/0040865 | A1 | * | 2/2003 | Rigazio et al. ............ 701/207 |
| 2003/0069683 | A1 | * | 4/2003 | Lapidot et al. ............ 701/117 |
| 2003/0169185 | A1 | * | 9/2003 | Taylor ....................... 340/945 |
| 2003/0187571 | A1 | * | 10/2003 | Impson et al. ............. 701/117 |
| 2004/0102895 | A1 | * | 5/2004 | Thayer et al. ............. 701/200 |

FOREIGN PATENT DOCUMENTS

JP        2001-338373      12/2001

* cited by examiner

Primary Examiner—Thomas G. Black
Assistant Examiner—Brian J Broadhead
(74) Attorney, Agent, or Firm—Pearne & Gordon LLP (57) ABSTRACT

The information provision system includes a terminal having a current position measurement section and a communications controller, which intermittently transmits information on the current position measured, a terminal position management section for managing the position of the terminal based on the current position information received, an accident/disaster information management section for collecting information on an accident or a disaster and managing the information according to occurrence location and time of the accidents, an warning information generator for generating warning information from the information on the accidents, an warning terminal identification section for identifying a terminal positioned in the neighborhood of the location of the accidents, and an warning transmitter for transmitting warning information to the identified terminal. The system prevents user who carries a terminal from sustaining a possible damage caused by the accidents.

20 Claims, 5 Drawing Sheets

INFORMATION PROVISION SYSTEM AND APPARATUS AND METHOD THEREFOR

BACKGROUND OF THE INVENTION

1. Field of the Invention

The present invention relates to an information provision system which provides a user who keeps a portable terminal with warning information and disaster prevention information and an apparatus and a method for implementing the system, particularly, to an information provision system which provides the user with warning information and disaster prevention information in accordance with the position of the user.

2. Description of the Related Art

In recent years, portable terminals equipped with position information measurement portion such as GPS (Global Positioning System) are on the market. Carrying such a terminal readily allows checkup of the user's current position and transmission of the position information.

Services have been devised which utilizes the position measurement feature. For example, JP-A-2001-338373 discloses a system where a target person carries a portable terminal equipped with position information measurement portion. On a request from a guardian of the person, center apparatus receives position information transmitted from the portable terminal and notifies the guardian of the position of the target person, and on a request to search for the target person, watchmen and the like search and protect the target person based on the position information on the portable terminal.

In such a system, the target person who has encountered an accident or a disaster can report his/her current position to the center apparatus to seek for help.

However, with the system of the related art, the user carrying a portable terminal equipped with the position measurement feature cannot perceive an accident or a disaster which has taken place in the neighborhood to avoid a possible damage. It often happens that the user does not notice an accident until he/she reaches the accident Location. For example, even when the train service is suspended due to an accident, a person heading for a station to take a train does not notice that the train is not running until he/she gets to the station. A person may encounter a big accident or incident without knowing it and thus may be ordered not to leave the location.

Under such a situation, it is too late regretting that a bus on a regular route was the right choice or another route should have been chosen if the incident were previously noticed.

According to the system of the related art, a target person who encountered an accident and called the center for help may have to wait for a rather long time before the watchman arrives.

SUMMARY OF THE INVENTION

The invention has an object to provide a system which reports information on an accident or a disaster occurring in a region around the user or a region where the user heads for, thus the user can take precautions not to sustain a damage due to such an abnormal situation and the user can be rescued in case the user should encounter the abnormal situation, as well as an apparatus and a method for implementing the system.

The invention provides an information provision system according to the invention has a center apparatus for providing information and a terminal for receiving information, wherein the terminal includes a current position measurement for measuring a current position of the terminal, and a transmitter for intermittently transmitting information on the current position measured by the current position measurement portion to the center apparatus, the center apparatus includes a terminal position management portion for managing a position of the terminal based on information on the current position received from the terminal, an accident/disaster information management portion for collecting information on an accident or a disaster and managing the collected information according to occurrence location and occurrence time of the accident or the disaster, warning information generation portion for generating warning information to be sent to the terminal based on the collected information on the accident or the disaster, a warning terminal identification portion for identifying a terminal positioned in the neighborhood of the location of the accident or the disaster, or a terminal moving toward the neighborhood of the location based on the information managed by the terminal position management portion, and a warning transmitter for transmitting the warning information to the terminal identified by the warning terminal identification portion.

When the center apparatus receives an emergency call from the terminal, the center apparatus identifies a terminal of a subscriber positioned in the neighborhood of the terminal which originated the emergency call based on the position information on the terminal managed by a terminal position management portion and reports position of the terminal which generated the emergency call to the terminal of said subscriber to seek a relief request.

The invention also provides a center apparatus, which provides a terminal with information, has a terminal position management portion for managing a position of the terminal based on information on the current position received from the terminal, a accident/disaster information management portion for collecting information on an accident or a disaster and managing the collected information according to occurrence location and occurrence time of the accident or the disaster, a warning information generation portion for generating warning information to be sent to the terminal based on the collected information on the accident or the disaster, a warning terminal identification portion for identifying a terminal positioned in the neighborhood of the location of the accident or the disaster based on the information managed by the terminal position management portion, a warning transmitter for transmitting the warning information to the terminal identified by the a warning terminal identification portion, and a communications control portion for controlling communications.

The invention also provides a terminal, which receives information from a center apparatus has a current position measurement portion for measuring current position of the terminal, and a communications control portion for controlling communications, a transmitter for intermittently transmitting information on the current position measured by the current position measurement portion to the center apparatus, a receiver for receiving information on an accident or a disaster taken place in the neighborhood of the current position or in the neighborhood of a destination where the terminal heads for from the center apparatus.

The invention also provides an information provision method of providing information to a terminal from a center apparatus, including steps of intermittently receiving information on current position of the terminal from the terminal to manage position information on the terminal, collecting information on an accident or a disaster to manage the information according to occurrence location and occurrence time of a accident or a disaster, generating warning information to report to the terminal based on the collected information on a accident or a disaster, identifying a terminal positioned in the neighborhood of occurrence location of an accident or a disaster based on the information on the position of a terminal managed, and transmitting the warning information to the terminal.

In this way, a user carrying a terminal receives information on an accident or a disaster taken place in the neighborhood of the current position or destination from the center apparatus. This allows the user to prevent a possible damage caused by a accident or a disaster.

In case the user has originated an emergency call to the center apparatus from the terminal, a relief request is issued to the nearest system subscriber from the center apparatus. This provides relief activities in a short time

DETAILED DESCRIPTION OF THE PREFERRED EMBODIMENTS (First Embodiment)

The first embodiment of the invention is an information provision system that provides a user with warning information on an accident or a disaster which has taken place around the user or in a region where the user heads for.

Figure 1:
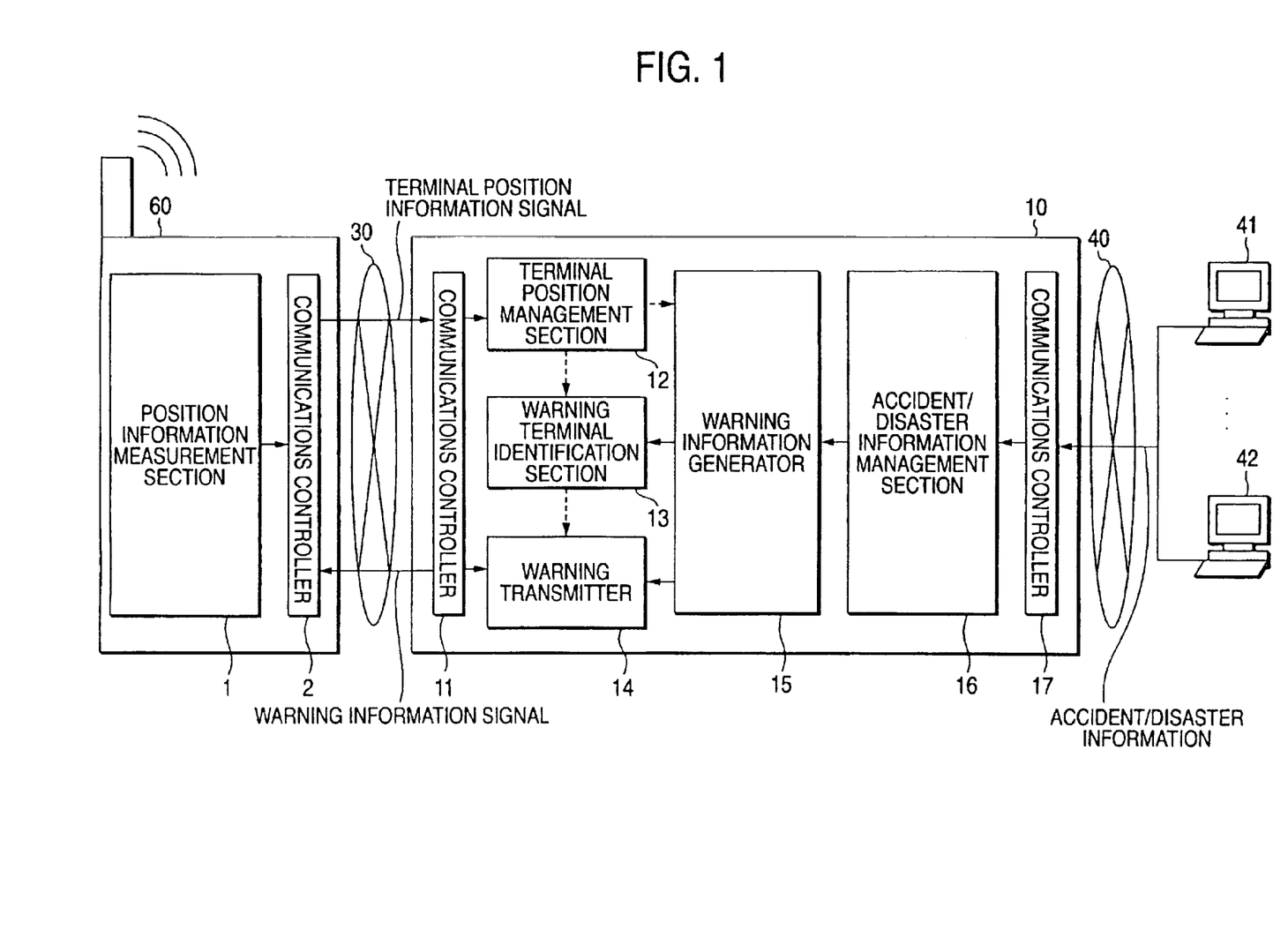
FIG. 1 is a block diagram showing the configuration of an information provision system according to the first embodiment of the invention.

As shown in FIG. 1, the system of the embodiment has a portable terminal 60 equipped with a positioning function, which a user obtains, accident/disaster information distribution apparatus 41, 42 for distributing information on an accident, a disaster or the like, and a center apparatus 10 for collecting accident or disaster information from the accident/disaster information distribution apparatus 41, 42 via a network 30 and providing the portable terminal 60 with warning information corresponding to the information on the position of the portable terminal 60 transmitted via a network 40.

The accident/disaster information distribution apparatus 41, 42 distributes accident information or disaster information obtained from a news agency, a municipality, police, a fire department, etc.

The portable terminal 60 is a cell phone, for example, has a position information measurement section 1 for measuring a current position by using GPS or the like and a communications controller 2 for transmitting position information measured by the position information measurement section 1 to the center apparatus 10 and receiving warning information from the center apparatus 10. The portable terminal 60 also has regular components of a cell phone.

The center apparatus 10 has a communications controller 11 for controlling communications with the portable terminal 60, a terminal position management section 12 for managing the position of the portable terminal 60, a communications controller 17 for controlling communications with the accident/disaster information distribution apparatus 41, 42, an accident/disaster information management section 16 for managing the information on an accident or a disaster collected from the accident/disaster information distribution apparatus 41, 42, an warning information generator 15 for generating warning information to report to the portable terminal 60, an warning terminal identification section 13 for identifying the terminal 60 to which the warning information is to be sent, and an warning transmitter 14 for transmitting warning information to the portable terminal 60.

The functions of the terminal position management section 12, the warning information generator 15, the warning terminal identification section 13, an accident/disaster information management section 16 and the warning transmitter 14 can be implemented by instructing a computer of the center apparatus 10 to perform process specified by a program.

Operation of the system will be described.

The accident/disaster information distribution apparatus 41, 42 distribute news delivered from a news agency and information on an accident and a disaster announced by municipalities, police, fire departments, etc. in local places to the center apparatus 10.

In the center apparatus 10, the accident/disaster information management section 16 classifies the collected information on accident or disaster by occurrence location or occurrence time of the accident or the disaster and manages the classified information.

In the portable terminal 60, the position information measurement section 1 measures the current position and the communications controller 2 periodically (for example every 10 minutes) transmits the measured information to the center apparatus 10.

When the terminal position management section 12 of the center apparatus 10 receives position information from the portable terminal 60, the terminal position management section 12 obtains the travel speed and travel direction of the portable terminal 60 from the position information and predicts the closest destination of the terminal 60 and stores and manages the position information on the destination together with the current position information in association with the address information on the portable terminal.

When the accident/disaster information management section 16 collects new accident/disaster information, the warning information generator 15 refers to the position information of the portable terminal 60 managed by the terminal position management section 12 to check that the portable terminal 60 is present in the neighborhood of the location of an accident or a disaster, and generates warning information including information such as the type of an accident or a disaster, its location and occurrence time. In this practice, the warning information generator 15 ranks the warning level of the warning information based on the time elapsed from the occurrence time of the accident.

The warning information generator 15 informs the warning terminal identification section 13 of the location of the accident or the disaster included in this warning information. The warning terminal identification section 13 refers to the information managed by the terminal position management section 12 to identify a portable terminal 60 positioned in the neighborhood of the location of the accident or the disaster or a portable terminal 60 heading for the neighborhood of the location of the accident or the disaster, and informs the warning transmitter 14 of the address of the portable terminal 60.

The warning transmitter 14 transmits the warning information generated by the warning information generator 15 to the address of the portable terminal 60 identified by the warning terminal identification section 13.

In this way, in this system, the center apparatus receives position information at constant intervals from the portable terminal and thus can provide the portable terminal with warning information, depending on its position, which is based on the information on an accident or a disaster which the center apparatus has previously colleted.

The user who utilizes the system, in case an accident or disaster has taken place in the neighborhood of his/her destination, can receive the corresponding warning information by using his/her portable terminal for early understanding of the state of the accident or the disaster. This previously prevents a possible damage caused by an accident or a disaster and allows an early countermeasure to be taken.

The alarm level assigned to the warning information is quite useful when the user who has received the warning information determines a countermeasure to take. The center apparatus may keep warning information of a low alarm level instead of transmitting the information to the portable terminal.

The position information measured by the portable terminal may be transmitted from the portable terminal to the center apparatus, either autonomously or in response to polling from the center apparatus.

(Second Embodiment)

The second embodiment is a system that relieves a user who has encountered an accident or a disaster.

In this system, when the user who has encountered an accident transmits an emergency call to the center apparatus, the center apparatus makes a request for a relief to a system subscriber near the location of the accident and pays certain compensation to the relief activity of the subscriber.

Figure 2:
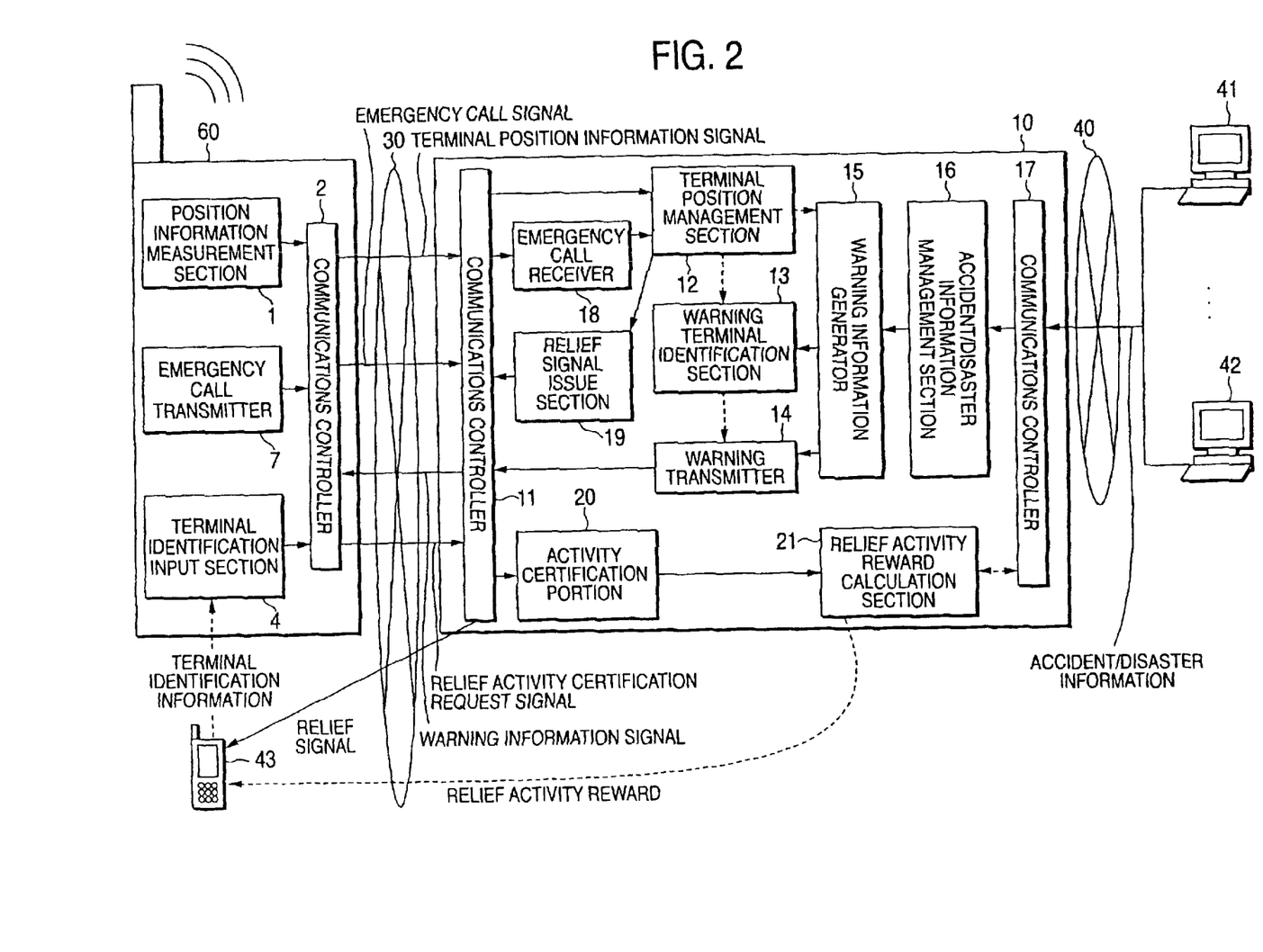
FIG. 2 is a block diagram showing the configuration of an information provision system according to the second embodiment of the invention.

As shown in FIG. 2, a portable terminal 60 of the system has an emergency call transmitter 7 for transmitting an emergency call and a terminal identification input section 4 for inputting the identification number of the portable terminal 43 of the reliever in order to acquire certification of the relief activity. A center apparatus 10 has an emergency call receiver 18 for receiving an emergency call, a relief signal issue section 19 for transmitting a relief request signal to a system subscriber near the location of an accident, relief activity certification portion 20 for certifying the relief activity of the reliever, and a relief activity reward calculation section 21 for calculating the reward for the certified relief activity. Other configuration is the same as that of the first embodiment (FIG. 1).

Operation of the system will be described.

The portable terminal 60 and the center apparatus 10 performs the following operation on top of the operation described in the first embodiment.

On an emergency, the emergency call transmitter 7 transmits an emergency call signal to the center apparatus 10. When the emergency call receiver 18 of the center apparatus 10 receives the emergency call from the portable terminal 60, the emergency call receiver 18 passes the emergency call to the terminal position management section 12. The terminal position management section 12 passes the information on the position of the portable terminal 60 and the information on the address of the portable terminal (relief subscriber terminal) 43 of a system subscriber positioned in the neighborhood of the location of the portable terminal 60 to the relief signal issue section 19.

The relief signal issue section 19 transmits a relief signal containing the information on the position of the portable terminal 60 to the relief subscriber terminal 43.

When the reliever possessing the relief subscriber terminal 43 goes to the position of the portable terminal 60 and relieves the owner of the portable terminal 60. The owner of the portable terminal 60 inputs the identification number of the relief subscriber terminal 43 by using the terminal identification input section 4 of the portable terminal 60 to transmit a relief activity certification request signal to the center apparatus 10 in order to report the relief activity of the reliever.

The relief activity certification request signal containing the identification number of the relief subscriber terminal 43 is input to the relief activity certification portion 20 of the center apparatus 10. The relief activity certification portion 20 checks the identification number contained in the relief activity certification request signal against the identification number of the relief subscriber terminal 43 which the relief signal issue section 19 transmitted the relief signal, and in the case there is a match, certifies the relief activity of the owner of the relief subscriber terminal 43. The relief activity reward calculation section 21 calculates a certain reward for the certified relief activity. The calculated reward is paid to the reliever.

Thus in this system, when the user makes a request for a relief to the center apparatus by using a portable terminal, a request for a relief is made to a system subscriber in the neighborhood of the user from the center apparatus. As a result, the user can receive a relief without having to wait for a long time. As reward is paid for the relief activity of the reliever, it is expected that a system subscriber who has received a request for a relief will willingly respond to the request.

(Third Embodiment)

The third embodiment is a system that provides a user with the state of an accident or a disaster in a picture.

Figure 3:
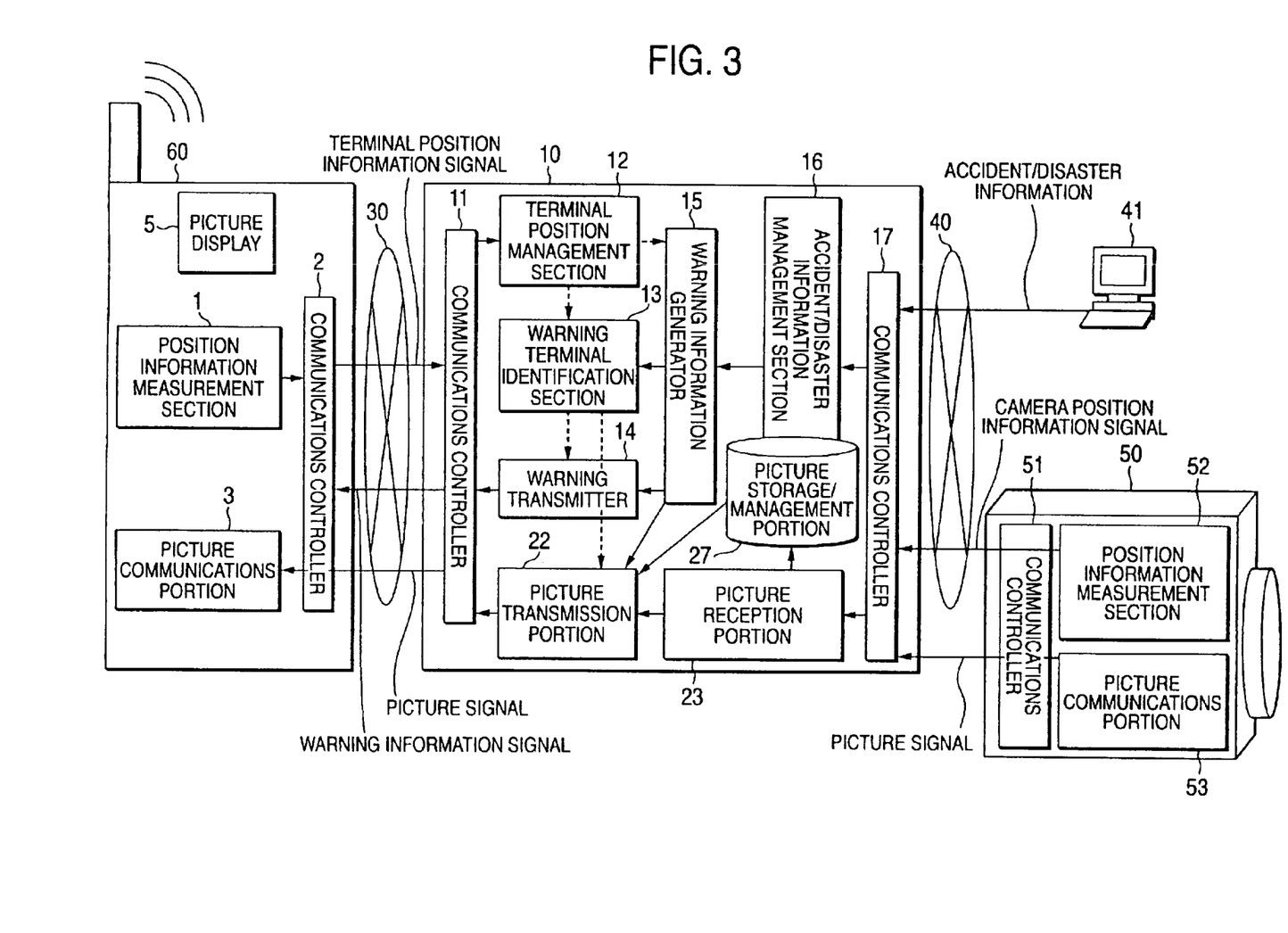
FIG. 3 is a block diagram showing the configuration of an information provision system according to the third embodiment of the invention.

As shown in FIG. 3, this system has a camera unit 50 for providing a picture to a center apparatus 10. The center apparatus 10 has picture reception portion 23 for receiving picture signal from the camera unit 50, picture storage/management portion 27 for storing the received picture signal, and picture transmission portion 22 for transmitting picture signal to the portable terminal 60. A portable terminal 60 has picture communications portion 3 for receiving picture signal, and a picture display 5 for displaying pictures.

Other configuration is the same as that of the first embodiment (FIG. 1).

The camera unit 50 is installed on a mobile unit such as a relay vehicle or installed at a fixed point such as a street corner or a customer's premises. The camera unit 50 has a position information measurement section 52 for measuring the position of the camera unit 50, picture communications portion 53 for transmitting the picture signal obtained, and a communications controller 51 for controlling transmission of camera position information and picture signal.

Operation of the system will be described.

The system performs the following operation on top of the operation described in the first embodiment.

The camera unit 50 transmits the picture signal and the camera position information measured by the position information measurement section 52 to the center apparatus 10. In the center apparatus 10, an accident/disaster information management section 16 classifies the camera position information by position and manages. The picture reception portion 23 receives the picture signal and stores the picture signal into the picture storage/management portion 27.

When the accident/disaster information management section 16 collects new accident/disaster information, the warning information generator 15 reports the location of the accident or the disaster to the warning terminal identification section 13 and retrieves a camera position in the neighborhood of the location of the accident or the disaster from the camera position information managed by the accident/disaster information management section 16. In the case the camera unit 50 is present in the neighborhood of the location of the accident or the disaster, the warning information generator 15 generates and transmits warning information front the warning transmitter 14 as well as instructs the picture transmission portion 22 to transmit the picture received from the camera unit 50.

The warning terminal identification section 13 refers to the information managed by the terminal position management section 12 to identify a portable terminal 60 positioned in the neighborhood of the location of the accident or the disaster, and passes the address of the portable terminal 60 to the warning transmitter 14 and the picture transmission portion 22.

The warning transmitter 14 transmits the warning information generated by the warning information generator 15 to the portable terminal 60. The picture transmission portion 22 transmits the picture signal from the camera unit 50 instructed by the warning information generator 15 to the picture communications portion 3 of the portable terminal 60.

In this practice, the warning information is transmitted in forms of text data, sound signal, still picture information, etc. and presented on the speaker or picture display 5 of the portable terminal 60. The picture signal is displayed on the picture display 5 of the portable terminal 60.

In the case the center apparatus 10 provides the portable terminal 60 with a picture in real time, the picture signal from the camera unit 50 received by the picture signal reception portion 23 is directly transmitted to the picture transmission portion 22. In the case a recorded picture is provided based on a request by the portable terminal 60, a recorded picture picked up by the same camera unit 50 is read from the picture storage/management portion 27 and transmitted to the picture transmission portion 22.

The portable terminal 60 can also utilize the function of a cellular phone to originate a call to the center apparatus 10 and request delivery of a current picture or a recorded picture from the camera unit 50 installed in the customer's premises.

In this way, according to the system, as the state of an accident or a disaster is provided in a picture, the user can grasp the detailed situation of the accident or the disaster.

(Fourth Embodiment)

The fourth embodiment is an information provision system where a center apparatus gives out the source of a picture and a portable terminal directly acquires a picture from a camera unit.

Figure 4:
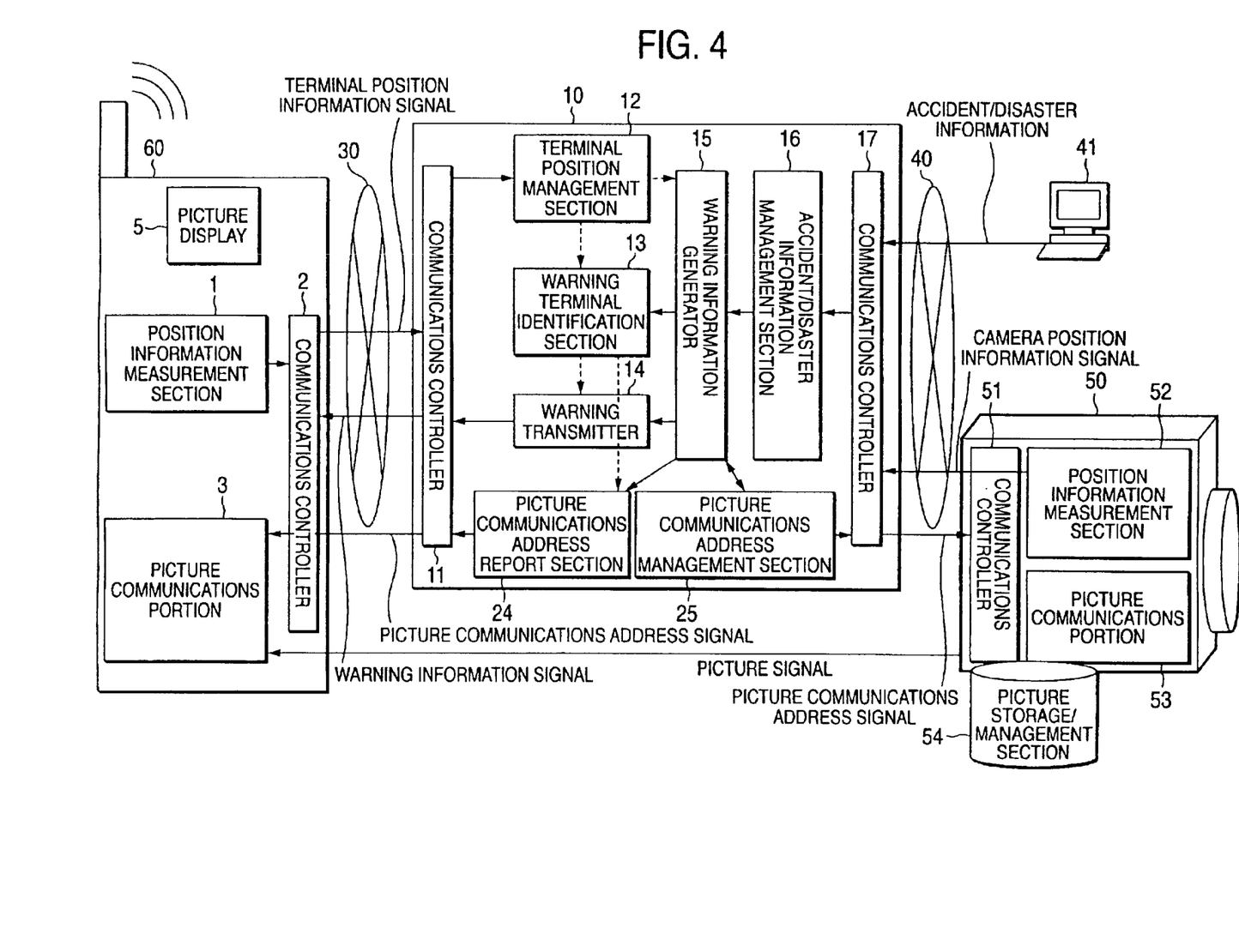
FIG. 4 is a block diagram showing the configuration of an information provision system according to the fourth embodiment of the invention.

As shown in FIG. 4, in this system, a center apparatus 10 has a picture communications address management section 25 for managing address of a camera unit 50 and a picture communications address report section 24 for reporting the address of the camera unit 50 to a portable terminal 60. The camera unit 50 also has a picture storage/management section 54 for providing a recorded picture. The Other configuration of the camera unit 50 and the configuration of the portable terminal 60 are same as those of the third embodiment (FIG. 3). Configuration of the center apparatus 10 other than the picture communications address management section 25 and the picture communications address report section 24 is the same as that of the first embodiment (FIG. 1).

Operation of the system will be described.

The camera unit 50 transmits camera position information measured by the position information measurement section 52 to the center apparatus 10. The accident/disaster information management section 16 of the center apparatus 10 manages the camera position information.

When the accident/disaster information management section 16 collects new accident/disaster information, the warning information generator 15 reports the location of the accident or the disaster to the warning terminal identification section 13 and retrieves a camera position in the neighborhood of the location of the accident or the disaster from the camera position information managed by the accident/disaster information management section 16. In the case the camera unit 50 is present in the neighborhood of the location of the accident or the disaster, the warning information generator 15 acquires the address of the camera unit 50 from the picture communications address management section 25 and transmits the address to the picture communications address report section 24 as well as transmits generated warning information to the warning transmitter 14.

The warning terminal identification section 13 refers to the information managed by the terminal position management section 12 to identify a portable terminal 60 positioned in the neighborhood of the location of the accident or the disaster, and passes the address of the portable terminal 60 to the warning transmitter 14 and the picture communications address report section 24. The warning transmitter 14 transmits the warning information to the portable terminal 60. The picture communications address report section 24 transmits the address of the camera unit 50 to the picture communications portion 3 of the portable terminal 60.

The address of the portable terminal 60 is also passed to the camera unit 50 via the picture communications address management section 25.

The picture communications portion 3 of the portable terminal 60 accesses the address of the camera unit 50 gave out to make picture delivery request. The camera unit 50 checks that the address of the portable terminal 60 matches the address passed from the center apparatus 10, sends live picture or recorded picture to the portable terminal 60 in accordance with the request.

In this way, the center apparatus 10 of this system only intervenes in picture transmittal. The actual transmittal is performed not via the center apparatus 10. This reduces the load on the center apparatus 10.

The user of the portable terminal 60 may refer to the warning information and may select acquisition of picture information only when necessary.

(Fifth Embodiment)

The fifth embodiment is an information provision system where a system subscriber who happens to be in the neighborhood of the location of an accident or a disaster provides another system subscriber with a picture picked up by the camera of a portable terminal.

Figure 5:
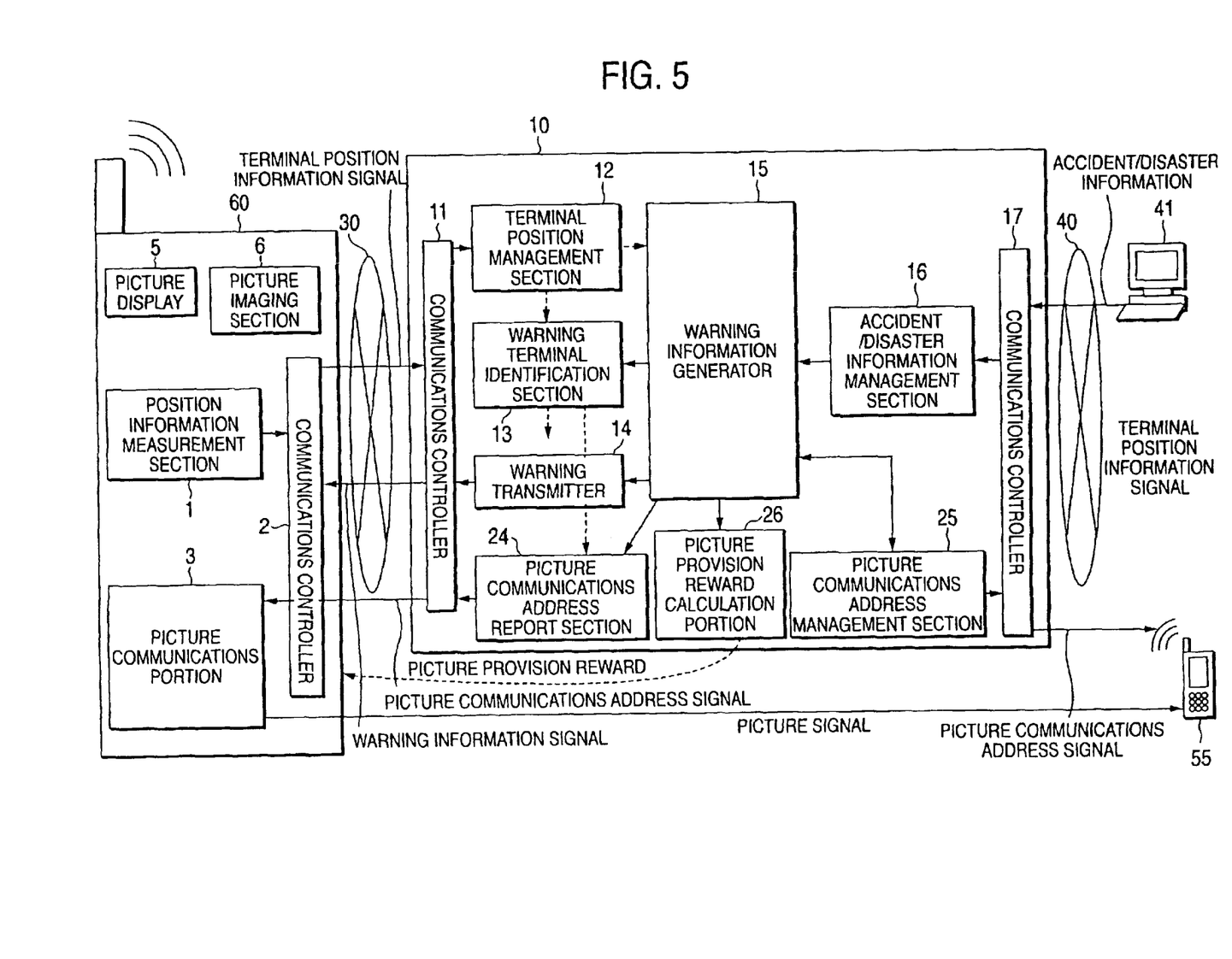
FIG. 5 is a block diagram showing the configuration of an information provision system according to the fifth embodiment of the invention.

As shown in FIG. 5, a portable terminal 60 of this system has a picture imaging section 6 and transmits a picture picked up by the picture imaging section 6 to the terminal (center-specified terminal) 55 of a system subscriber specified by the center apparatus 10. The center apparatus 10 pays a reward for provision of this picture. Thus, the center apparatus 10 has picture provision reward calculation portion 26 for calculating the amount of the reward.

Other configuration is the same as that of the fourth embodiment (FIG. 4).

Operation of the system will be described.

When the accident/disaster information management section 16 collects new accident/disaster information, the warning information generator 15 reports the location of the accident or the disaster to the warning terminal identification section 13. The warning information generator 15 generates the warning information on the accident or the disaster and transmits the generated warning information to the warning transmitter 14. The warning information generator 15 also acquires address of the terminal (center-specified terminal) 55 from the picture communications address management section 25 and transmits the acquired address to the picture communications address report section 24.

The warning terminal identification section 13 refers to the information managed by the terminal position management section 12 to identify a portable terminal 60 currently positioned in the neighborhood of the location of the accident or the disaster, and passes the address of the portable terminal 60 to the warning transmitter 14 and the picture communications address report section 24.

The warning transmitter 14 transmits the warning information to the portable terminal 60. The picture communications address report section 24 transmits the address of the center-specified terminal 55 to the picture communications portion 3 of the portable terminal 60.

The warning transmitter 14 also transmits the address of the portable terminal to the center-specified terminal 55 via the picture communications address management section 25.

The user of the portable terminal 60 which receives the warning information refers to the location of an accident contained in the warning information and visits the location of the accident and images the location with the picture imaging section 6 of the portable terminal 60. The picture communications portion 3 of the portable terminal 60 transmits the picture signal from the picture imaging section 6 to the address of the center-specified terminal 55 specified by the center apparatus 10.

The center-specified terminal 55 checks that the address of the portable terminal 60 matches the address passed from the center apparatus 10, receives the picture signal transmitted from the portable terminal 60 and displays the corresponding picture on a picture display.

The picture provision reward calculation portion 26 of the center apparatus 10 determines the value of the picture information which the portable terminal 60 provided to the center-specified terminal 55 and calculates the reward to pay to the user of the portable terminal 60.

The warning information generator 15 may refers to the information managed by the terminal position management section 12 to choose a portable terminal which will move in the near future to the neighborhood of the location of an accident as a center-specified terminal 55. A picture from the portable terminal 60 may be received by the center apparatus 10, and utilized as a picture provided to a system subscriber.

In this way, according to the system, it is possible to utilize a picture which a system subscriber picked up by the camera of his/her portable terminal as information provided to another system subscriber. A reward is paid for provision of the picture so that it is expected that a system subscriber will willingly provide a picture picked up.

As explained the above, a user carrying a terminal receives information on an accident or a disaster taken place in the neighborhood of the current position or destination from the center apparatus. This allows the user to prevent a possible damage caused by a accident or a disaster.

A picture is transmitted to the terminal of the user from the center apparatus or transmitted from a mobile camera or a fixed camera via the center apparatus or directly transmitted from a camera of another terminal of a system subscriber. Thus, the user can check the detailed situation of the accident or the disaster by way of a picture.

In the case the user has originated an emergency call to the center apparatus from the terminal, a relief request is issued to the nearest system subscriber from the center apparatus. This provides relief activities in a short time.

What is claimed is:

1. An information provision system comprising a center apparatus for providing information and a terminal for receiving information, wherein said terminal includes:

current position measurement means for measuring a current position of the terminal; and a transmitter for intermittently transmitting information on the current position measured by said current position measurement means to the center apparatus, and said center apparatus includes:

terminal position management means for managing a position of said terminal based on information on the current position received from the terminal;

accident/disaster information management means for collecting information on an accident or a disaster and managing the collected information according to occurrence location and occurrence time of the accident or the disaster;

warning information generation means for generating warning information to be sent to the terminal based on the collected information on the accident or the disaster;

warning terminal identification means for identifying a terminal positioned in the neighborhood of the location of the accident or the disaster, or a terminal moving toward the neighborhood of said location based on the information managed by said terminal position management means; and a warning transmitter for transmitting said warning information to the terminal identified by the warning terminal identification means; and wherein said warning information generation means assigns said warning information a warning level classified based on the time elapsed from occurrence time of an accident or a disaster.

2. The information provision system according to claim 1, wherein said terminal position management means predicts and manages the closest destination of said terminal based on a travel speed and a travel direction in the current position received from said terminal, and said warning terminal identification means incorporates said terminal of which destination is in the neighborhood of the location of the accident or the disaster into said terminal to be identified.

3. An information provision method of providing information to a terminal from a center apparatus, comprising steps of:

intermittently receiving information on current position of said terminal from the terminal to manage position information on said terminal;

collecting information on an accident or a disaster to manage the information according to occurrence location and occurrence time of a accident or a disaster;

generating warning information to report to the terminal based on the collected information on a accident or a disaster;

identifying a terminal positioned in the neighborhood of occurrence location of an accident or a disaster based on the information on the position of a terminal managed; and transmitting said warning information to said terminal;

wherein said center apparatus identifies a terminal positioned in occurrence location of an accident or a disaster based on the position information of a terminal, and instructs said terminal to transmit a picture picked up by picture imaging means of said terminal to a terminal or center apparatus positioned in the neighborhood of the location of said accident or said disaster;

wherein said center apparatus determines value of a picture picked up by the picture imaging means of said terminal.

4. A center apparatus, which provides a terminal with information, comprising:

terminal position management means for managing a position of said terminal based on information on the current position received from the terminal;

accident/disaster information management means for collecting information on an accident or a disaster and managing the collected information according to occurrence location and occurrence time of the accident or the disaster;

warning information generation means for generating warning information to be sent to the terminal based on the collected information on the accident or the disaster;

warning terminal identification means for identifying a terminal positioned in the neighborhood of the location of the accident or the disaster based on the information managed by the terminal position management means;

a warning transmitter for transmitting the warning information to the terminal identified by the warning terminal identification means; and communications control means for controlling communications;

wherein said warning information generation means assigns said warning information warning level classified based on the time elapsed from occurrence time of an accident or a disaster.

5. The center apparatus according to claim 4, further comprising:

emergency call reception means for receiving an emergency call transmitted from said terminal; and relief signal issue means for identifying a terminal of a subscriber positioned in the neighborhood of the terminal which originated said emergency call based on the position information on the terminal managed by said terminal position management means, and transmitting a relief request signal to the terminal of said subscriber.

6. The center apparatus according to claim 5, further comprising:

relief activity certification means for certifying a relief activity on receiving a identification information of the terminal which transmitted said relief request signal from the terminal which originated said emergency call; and relief activity reward calculation means for calculating a reward for said certified relief activity.

7. The center apparatus according to claim 4, further comprising:

picture reception means for receiving a picture signal from a camera unit; and picture transmission means for transmitting said picture signal to said terminal, wherein said picture transmission means transmits the picture signal from the camera unit in the occurrence location of an accident or a disaster to a terminal identified by said warning terminal identification means.

8. The center apparatus according to claim 7, further comprising:

picture storage/management means for storing and managing the picture signal received by said picture reception means, wherein said picture transmission means transmits the picture signal stored in said picture storage/ management means to said terminal.

9. The center apparatus according to claim 4, further comprising:

picture communications address management means for managing a picture communications address of a camera unit; and picture communications address report means for reporting the picture communications address of said camera unit to said terminal, wherein said picture communications address report means reports the picture communications address of the camera unit in the occurrence location of an accident or a disaster to a terminal identified by said warning terminal identification means.

10. A center apparatus, which provides a terminal with information, comprising:

terminal position management means for managing a position of said terminal based on information on the current position received from the terminal;

accident/disaster information management means for collecting information on an accident or a disaster and managing the collected information according to occurrence location and occurrence time of the accident or the disaster;

warning information generation means for generating warning information to be sent to the terminal based on the collected information on the accident or the disaster;

warning terminal identification means for identifying a terminal positioned in the neighborhood of the location of the accident or the disaster based on the information managed by the terminal position management means;

a warning transmitter for transmitting the warning information to the terminal identified by the warning terminal identification means; and communications control means for controlling communications;

picture communications address report means for reporting the destination of a picture picked up by picture imaging means of said terminal to another terminal, wherein said warning terminal identification means identifies a first terminal positioned in occurrence location of an accident or a disaster based on the information managed by said terminal position management means, and the picture communications address report means reports a second terminal or center apparatus to which said warning information identified by said warning terminal identification means is transmitted, as a destination of the picture picked up by said picture imaging means, to said second terminal; and picture provision reward calculation means for determining the value of the picture picked up by the imaging means of said terminal and calculating a reward depending on said value.

11. An information provision method of providing information to a terminal from a center apparatus, comprising steps of:

intermittently receiving information on current position of said terminal from the terminal to manage position information on said terminal;

collecting information on an accident or a disaster to manage the information according to occurrence location and occurrence time of a accident or a disaster;

generating warning information to report to the terminal based on the collected information on a accident or a disaster;

identifying a terminal positioned in the neighborhood of occurrence location of an accident or a disaster based on the information on the position of a terminal managed;

transmitting said warning information to said terminal; and, assigning said warning information warning alarm level classified based on the time elapsed from occurrence time of an accident or a disaster, wherein the transmitting step transmits said warning information assigned the alarm level.

12. The information provision method according to claim 11, wherein prior to the step of assigning said warning information warning alarm level classified based on the time elapsed from occurrence time of an accident or a disaster, the method further comprising a step of:

predicting the closest destination of said terminal based on a travel speed and a travel direction in the current position received from said terminal, wherein the transmitting step transmits said warning information to said terminal moving in the neighborhood of occurrence location of an accident or a disaster.

13. The information provision method according to claim 11, wherein when said center apparatus receives an emergency call from said terminal, said center apparatus identifies a terminal of a subscriber positioned in the neighborhood of the terminal which originated said emergency call based on the position information on the terminal managed and reports position of the terminal which generated said emergency call to the terminal of said subscriber to seek a relief request.

14. The information provision method according to claim 13, wherein a reward is paid to a subscriber who has done a relief activity in response to said relief request.

15. The information provision method according to claim 11, wherein said center apparatus receives a picture signal from a camera unit in occurrence location of an accident or a disaster, and transmits said picture signal to a terminal to which said warning information is transmitted.

16. The information provision method according to claim 15, wherein said center apparatus receives a picture signal from the camera unit to store and manage, and transmits the picture signal, which is received from the camera unit in the location of an accident or a disaster and stored, to a terminal to which said warning information is transmitted.

17. The information provision method according to claim 15, wherein said center apparatus reports picture communications address of a camera unit in the location of an accident or a disaster to a terminal to which said warning information is transmitted, and said terminal receives a picture signal from the picture communications address of said camera unit.

18. The information provision method according to claim 17, wherein said camera unit stores and manages the picture signal picked up and transmits the stored picture signal to said terminal which accesses said camera unit.

19. The information provision method according to claim 15, wherein said camera unit is installed on a mobile unit.

20. The information provision method according to claim 15, wherein said camera unit is installed at a fixed point.

* * * * *